(12) United States Patent
Noglotte

(10) Patent No.: US 8,742,307 B2
(45) Date of Patent: Jun. 3, 2014

(54) SOLAR PANEL DEVICE

(76) Inventor: Thierry Noglotte, Guadeloupe (FR)

( * ) Notice: Subject to any disclaimer, the term of this patent is extended or adjusted under 35 U.S.C. 154(b) by 210 days.

(21) Appl. No.: 13/144,773

(22) PCT Filed: Jan. 15, 2010

(86) PCT No.: PCT/FR2010/000036
§ 371 (c)(1),
(2), (4) Date: Oct. 27, 2011

(87) PCT Pub. No.: WO2010/081970
PCT Pub. Date: Jul. 22, 2010

(65) Prior Publication Data
US 2012/0036800 A1    Feb. 16, 2012

(30) Foreign Application Priority Data

Jan. 15, 2009  (FR) .................................... 09 00171
Jan. 15, 2009  (FR) .................................... 09 00173

(51) Int. Cl.
*H01L 31/042*    (2014.01)

(52) U.S. Cl.
USPC ............... 250/203.4; 250/203.1; 136/246; 126/600

(58) Field of Classification Search
USPC ......... 250/203.1, 203.3, 203.4; 136/244, 245, 136/246; 126/572, 573, 600, 621; 52/173.3
See application file for complete search history.

(56) References Cited

U.S. PATENT DOCUMENTS

| 8,136,783 B2 * | 3/2012 | Pietrzak .................. 248/370 |
| 2008/0163921 A1 * | 7/2008 | Leong et al. .............. 136/246 |
| 2009/0151775 A1 | 6/2009 | Pietrzak |

FOREIGN PATENT DOCUMENTS

| DE | 10134045 C1 | 4/2003 |
| DE | 202007017719 U1 | 3/2008 |

OTHER PUBLICATIONS

International Search Report (ISR) of PCT/FR2010/000036, dated Oct. 22, 2010.
International Preliminary Report on Patentability (IPRP, English translation) of PCT/FR2010/000036, dated Aug. 2, 2011.

* cited by examiner

*Primary Examiner* — Kevin Pyo
(74) *Attorney, Agent, or Firm* — Westerman, Hattori, Daniels & Adrian, LLP

(57) ABSTRACT

The invention relates to a solar panel device that comprises a fixed anchoring holder (10), which includes at least one mobile panel holder (20) bearing at least one solar panel (30, 31), at least three jacks (40, 41, 42) with a jack body connected to the anchoring holder and a mobile rod capable of translation in said body, and at least three ball and socket joints (50, 51, 52). Each ball and socket joint is connected (i) to the mobile panel holder and (ii to the rod of the jacks, and the mobile panel holder (i) is capable of translation and (ii) can be oriented according to the respective position of the rods of the at least three jacks. The invention can particularly be used for producing electricity in residential housings.

21 Claims, 4 Drawing Sheets

SOLAR PANEL DEVICE

The present invention relates to a device for supporting solar panels. It relates more particularly to such a device capable of following the path of the sun.

Devices capable of following the path of the sun, referred to as solar tracking devices, are known in the art.

These allow the solar panels to be continuously oriented towards the sun, in order to increase the generated electrical power.

In practice, the market for solar tracking devices has grown almost exclusively in the market of industrial generation farms.

These include the devices of the building-mounted type, installed at the headquarters of the Solener S.A.™ company. They also include the following ground-based devices: Nevada Solar One™, which is a commercial farm producing 64 MW of power, and the devices installed in a solar plant at Sol-Luce Jindovada Solar™ in Sacramento, Calif., devices installed at the Nellis Air Force Base™, Nevada, devices installed in Toledo, Spain, devices installed by SOLFO-CUS™ and the devices at SOLAR PARK EXTREMADU-RAL™.

Such devices, which perform tracking in order to maximize the generated power, are complex devices which, quite often are associated with technologies that concentrate solar radiation in order to maximize the generation of thermal, electrical, or other kinds of power . . . .

In some cases, the panels are oriented along a single axis. In other cases, they are oriented along two axes.

Also, to date, there is no system for the acquisition and processing of data related to the generation of power, in particular electrical power, which is reliable and allows data to be collected throughout vast geographical areas that may extend across regions, countries or even the entire world.

However, the acquisition and processing of such data would allow, in particular, the power generation environment within large geographic areas to be better under stood, and advantageously, based on this knowledge, power generation and maintenance of installed systems to be predicted and, as a consequence, exploitation of this power to be improved.

in view of the above, a problem to be solved by the object of the present invention is to provide a device comprising solar panels, in particular of the communicating type, which can be installed not only on the ground, but also mounted on, or integrated into a building, in particular but not exclusively, in collective or residential dwellings.

The solution proposed in the present invention to solve this problem relates to a device comprising a fixed anchoring holder, characterized in that it further comprises a movable panel holder carrying at least one solar panel, at least three actuators each provided with an actuator body integral with said anchoring holder and a rod movable in translation in said body, and at least three ball, joints, each ball joint being integral, on one hand, with the movable panel holder, and on the other hand, with the actuator rod, and in that said movable panel holder is, on one hand, movable in translation, and on the other hand, can be an according to the respective positions of the rods of said at least three actuators.

Advantageously, the anchoring holder is mounted on, or integrated into a building;—solar panels are photovoltaic panels;—the device comprises at least one sensor capable of measuring the values of parameters dependent on sunlight;—the sensor (s) is/are radiation, current, voltage or temperature sensors;—the device further comprises a board for acquiring values of parameters measured by the sensors;—the device further comprises a board for controlling the position of the actuators according to the values of the parameters acquired by the acquisition board, so that, during the day, the panels follow the path of the sun; the strokes of the actuators are controlled independently; and—the device also comprises rotary actuators.

Advantageously, the device is associated with a plurality of local servers for storing characteristic data of measurements of local values of parameters that are directly or indirectly dependent on, and/or related to the amount of power received or generated by said devices, and for transmitting such data;

centralized and remote data storage means, for storing the data transmitted by the local servers;

a first communication network for transmitting the local measurement data to the local servers; and a second communication network for transmitting the data from the local servers to the centralized storage means.

The invention will be better understood after reading the following non-limiting description with reference to the accompanying drawings, in which:

FIG. 1 schematically illustrates different means implemented according to the invention;

Figure 3:
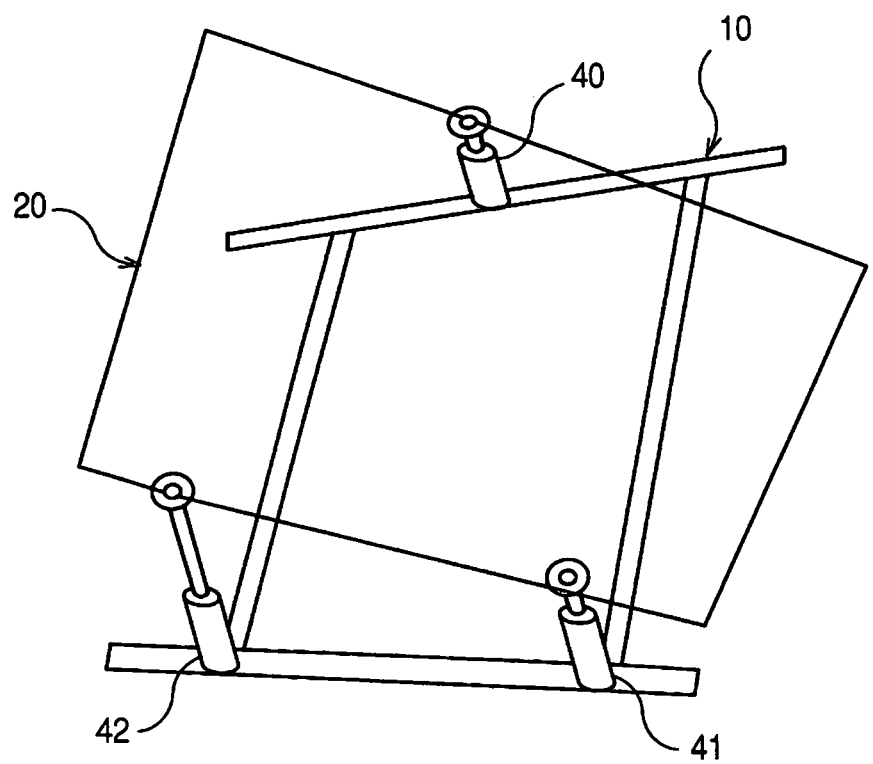
Figure 4:
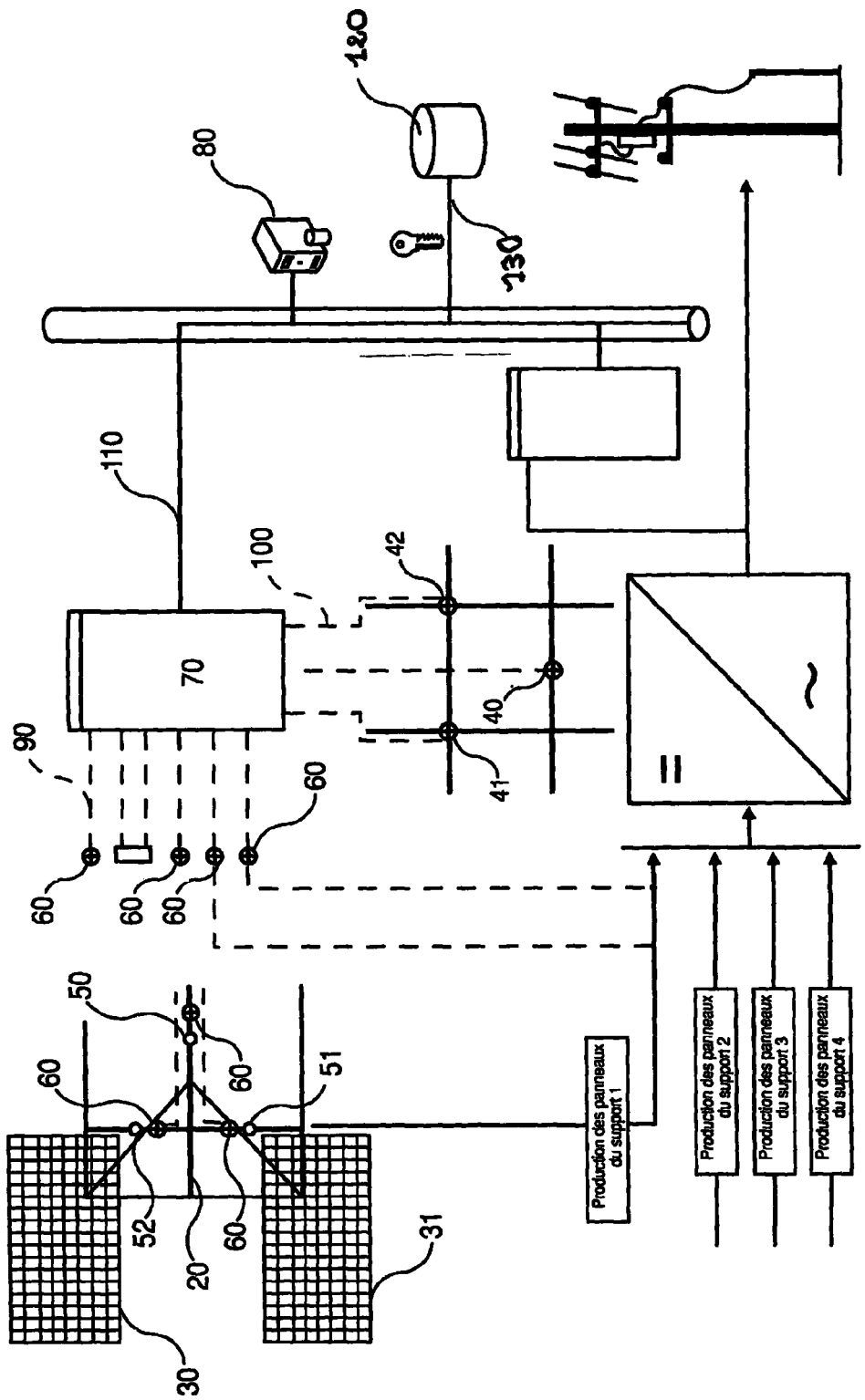

FIG. 3 schematically show a device according to the invention oriented in a particular manner using the combined means of the invention; and FIG. 4 is a detailed view of said means for controlling the strokes of the actuators of a device according to the invention.

The device according to the invention is a solar panel device. These solar panels are in particular photovoltaic panels or thermal panels. However, they may be any panel designed to collect the power from the sun or redirect it to an oven, as is the case in some of the aforementioned prior art farms.

Figure 1:
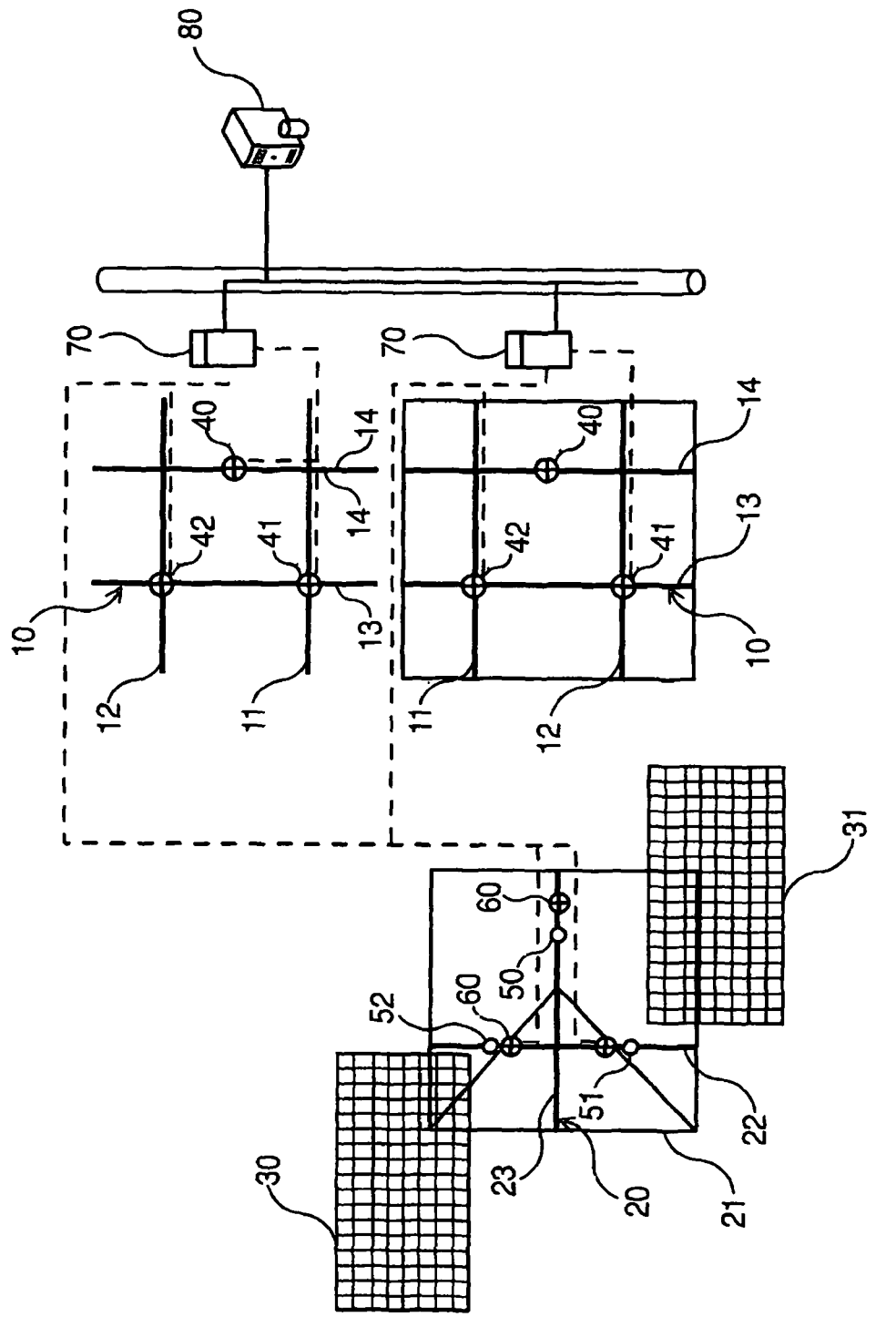

As is schematically shown in FIG. 1, the devices according to the invention comprise a fixed anchoring holder 10 and a movable panel holder 20.

Figure 2A:
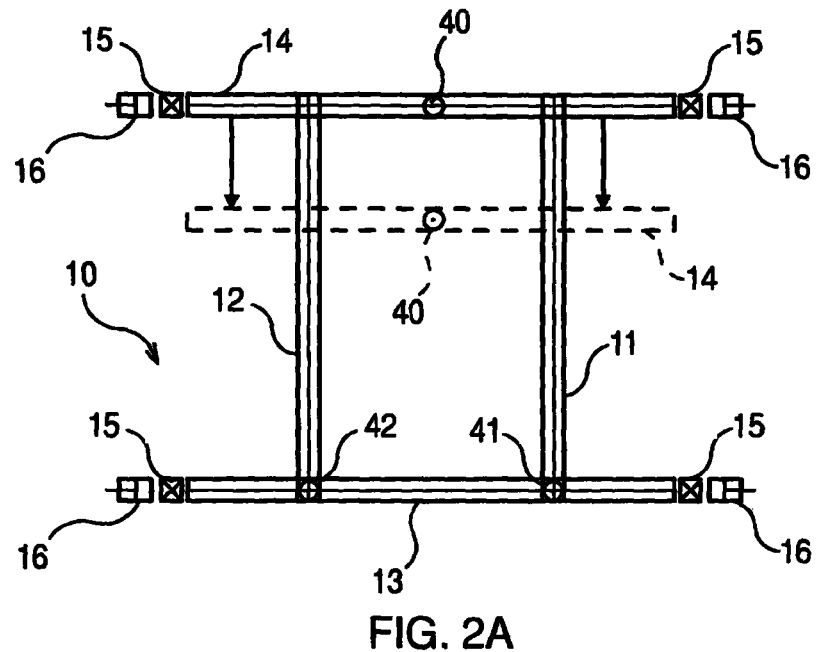
FIG. 2A shows a top view of an anchoring holder of a device according to the invention.

As is more particularly detailed in FIG. 2A, holder 10 comprises, in one embodiment, a rigid metal support structure consisting of four metal bars. Two first bars 11, 12 are arranged parallel to each other, in one direction. Two other bars 13, 14 are arranged parallel to each other and perpendicular to the first two bass. The anchoring holder is assembled onto a building, or integrated into such a building, for example, in an isolated dwelling, or also, fixed to the ground. It is held in place by fastening and/or anchoring brackets 15, and stopping and blocking abutments provided with a return spring 16, in particular when the building to which the holder is attached has a slope. Preferably, one of the bars of the support structure, for example bar 14, is movable in translation along bars 11, 12, which are perpendicular to it, so as to adapt the device to the stresses exerted by the building.

Figure 2B:
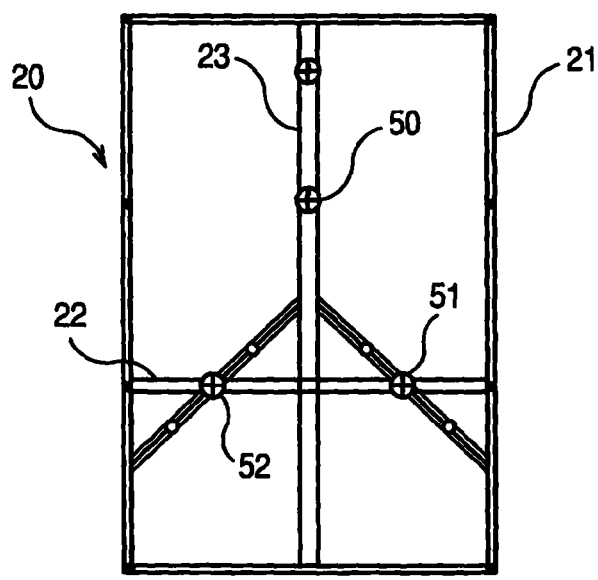
FIG. 2B shows a bottom view of a movable panel holder of a device according to the invention.

As is more particularly shown in detail in FIG. 2B, holder comprises, in one embodiment, a metal support structure consisting of a rigid frame 21 in which metal bars 22, 23 are arranged.

Holder 20 carries one or more solar panels 30, 31. In the example of FIG. 1, it carries two of these. These solar panels are assembled to said holder 20 through conventional assembly means.

Also, the device according to the invention comprises at least three actuators 40, 41, 42. These actuators are, for example, of the hydraulic, pneumatic, mechanical or electrical type. Each actuator is provided with an actuator body and a rod. The base or head of each actuator body is attached integral with the anchoring holder 10, for example screwed into a threaded hole, whose inclination is an adjustable parameter, in the support structure of said holder 10. The rod of each actuator is provided with a head. Said rod is movable in translation in the actuator body.

The axis of the actuators, that is, the axis along which the rod moves, is generally positioned vertically, and consequently perpendicular to the ground. The tilt angle is adjustable with respect to the plane defined by holder 10. Moreover, the actuators are not positioned mutually aligned within the plane of said holder. They are positioned so as to form a triangle, for example an isosceles triangle, as is particularly apparent from FIG. 2A.

In a particular embodiment of the invention, the aforementioned actuators are coupled to rotary actuators. In this embodiment, the holder becomes triaxial.

Furthermore, the device according to the invention comprises at least three ball joints 50, 51, 52. Each ball joint is made integral, either directly or indirectly, with an actuator rod, when the ball joint is attached to the head of the actuator rod. Each ball joint is also attached integral with the mobile holder 20.

The ball joints 50, 51, 52 may be said to be active or passive. So-called active ball joints can, for example, consist of rotary actuators.

Thus, the holder 20 is located above the holder 10, which carries panels 30, 31 in addition, said holder 20 can be oriented depending on the position of the actuators, by means of the ball joints. This is schematically shown in FIG. 3. In this figure, holder 20 is shown to be oriented at a given position which is offset with respect to that of the anchoring holder 10, this offset position being defined, by the different, independently controlled strokes of the three actuators 40, 41 and 42.

Of course, holders 10 and 20 as well as the other components of the device according to the invention are designed so as to withstand various external influences such as snow, gusty winds and a saline environment.

Finally, the device according to the invention comprises servo-control means for controlling the actuators. These means are formed by sensors 60, one or more boards 70 for acquiring data and steering the actuators, and a local computer/server 80.

Specifically, as shown in FIG. 5, the sensors 60 are connected to the boards 70 by any connection means 90. The boards 70 are themselves connected to the actuators 40, 41, 42 through connection means 100 which allow these actuators to be controlled. Furthermore, the boards 70 are connected to the local computer/server 80 through any connection means 110, for example USE cables and a local area network of the Ethernet type.

The sensors 60 measure the values of parameters that are dependent on the climatic environment and sunlight. These sensors are, for example, radiation, current, voltage or temperature sensors. Thus, when the panels are photovoltaic panels, the measured values are data related to the generation, or generation environment of electricity, which data may be collected according to the invention.

For this purpose, the values measured by the sensors 60 are transmitted to board 70. The measured values acquired by board 70 are then transmitted via means 110, to the local server 80, where they are stored. The server 80 analyzes the received data, determines an optimum position of the panels according to the maximum power gain constraint, then sends back to board 80, in particular to its controlling portion, instructions for controlling the actuators so as to achieve the optimum position. For example, these instructions are provided by the Ethernet/USB network 110 or by a carrier current. Board 70, which receives these instructions, independently controls the three actuators 40, 41 and 42 so that the panels carried by holder 20 are at an optimum position relative to the sun. The above operations are carried out substantially in real time. As a result, the panels, which follow the path of the sun, are continuous.

It should be noted that according to a particular embodiment of the invention, the device is capable of operating in a stand-alone manner, with tracking and acquisition being performed without any local sever/computer. According to this embodiment, the panel may, for example, simply follow the path of the sun, for example its azimuth in this case, the control of the actuators is achieved, for example, by an internal microcontroller-based board, coupled to sensors (of the optoelectronic, current, voltage, temperature . . . type).

Power generation is then maximized. It is estimated that this generation exceeds by 40% the power generated by a system having devices comprising the same number of panels, with the same surface, but which does not follow the path of the sun.

By means of the invention, the gain in power, in particular electrical power, is thus substantial.

Advantageously, a plurality of devices according to the invention are arranged on a particular power generation site and there is a plurality of sites, each comprising a plurality of devices. For example, the generating sites are, but are not limited to, private or collective dwellings.

On each of the power generation sites, the system according to the invention further comprises one or more local sensors adapted to the measurement of values of parameters that are directly or indirectly dependent on, and/or related to the amount of power received by the local devices. In this case, these are in particular radiation, current, voltage or temperature sensors. More particularly, the measured parameter values are data related to the generation of, or the generation environment of electricity.

The sensors are connected to data acquisition boards through any connection means, such as wire connections. These boards furthermore advantageously have a function of controlling the actuators to which they are connected.

Furthermore, the system according to the invention comprises a plurality of local servers for recording data, which is characteristic of the measurements of values of sunlight parameters that are obtained locally by means of the sensors, and for transmitting such data. In practice, there is one server per power generation site.

Furthermore, the system according to the invention comprises centralized means 120 for storing and processing the data transmitted by the local servers 80 (see FIG. 4). These means are not located close to the power generation sites. This is the case, of course, when the power generation sites are scattered throughout a large geographical area. These means may be installed anywhere in the world.

Finally, the system according to the invention comprises a first communication network 110 for transmitting the local measurement data acquired by the boards to the local servers and a second communication network 130 for transmitting the data from the local servers to the centralized storage and processing means, with the data flowing within said second network being advantageously made secure, for example by means of an encryption algorithm. Thus, each local server is additionally connected to the board, in particular to the built-in control functions of said board, for the purpose of carrying out the control of the actuators and consequently of controlling the orientation of the panels.

The local networks in each power generation site are for example wired local networks of the Ethernet or USE type, or carrier current networks, or also wireless networks such as GSM, GPRS, UMTS or HSPDA networks. The second network 60 is for example the Internet network.

The sensors measure parameter values that depend, directly or indirectly, on sunlight and climatic conditions. These values, once they have been acquired by the above-mentioned boards, are transmitted through the local network to the local servers. They are then transmitted by the second network, to centralized storage and processing means. This data is then advantageously processed in the centralized acquisition and processing means, or in means associated with the centralized means.

For this purpose, the centralized means transmit driving instructions from the local devices to the local servers. Of course, these instructions are specific to each site depending on the local environmental conditions, in particular sunlight. The instructions transmitted to the local server are different from those sent to the server, because the sites associated with these local servers are different, but also because the environmental conditions, such as sunlight at the location of these sites, are different.

The system advantageously implements Computer Aided Production Management (CAPM) applied to solar power generation, in particular of the photovoltaic type.

The system also advantageously implements a Centralized Technical Management (Expert System) software package for predicting and detecting failures, measuring and anticipating (predicting) the generation produced by the considered plant at a given date. Thus, it is possible to improve the forecast and predicted generation of photovoltaic electricity for each producer concerned.

The system can thus ensure the prediction of electricity generation for each power generation site based on the generation history and environment.

The invention further allows the maintenance of the photovoltaic power stations to be optimized and the photovoltaic power stations to be made secure, by developing expert systems.

It should also be noted that, using the combined means according to the invention, the administration of the solar panel devices can be performed remotely.

It should further be noted that the power supplied by the device according to the invention can be recovered to power the actuators and boards in said device, which thus becomes standalone in terms of its power consumption.

Of course, the invention is not limited to the embodiments described above. The latter must be understood in a broad sense, as encompassing all embodiments within the scope of the claims.

The invention claimed is:

1. A solar panel device comprising:
   a fixed anchoring holder,
   a mobile panel holder carrying at least one solar panel,
   at least three actuators each provided with (i) an actuator body and (ii) a rod which is movable in translation in said body, wherein one of the body and the rod of each of the actuators is mounted on said anchoring holder, and
   each of the ball joints being mounted between (i) the other of the body and the rod of a respective one of the actuators and (ii) the mobile panel holder,
   wherein said mobile panel holder (i) is movable in translation, and (ii) can be oriented along the respective positions of the rods of said at least three actuators.

2. The device according to claim 1, wherein the anchoring holder is mounted to or integrated into a building.

3. The device according to claim 1, wherein the solar panels are photovoltaic panels.

4. The device according to claim 1, which comprises at least one sensor adapted to measure values of parameters that depend on sunlight.

5. The device according to claim 4, wherein the sensor(s) is/are radiation, current, voltage or temperature sensors.

6. The device according to claim 4, which further comprises a board for acquiring values of parameters measured by the sensor(s).

7. The device according to claim 6, which further comprises a board for piloting a position of the actuators according to the values of the parameters acquired by the acquisition board, so that, during the day, the panels follow the path of the sun.

8. The device according to claim 1, wherein a course of each of the actuators is controlled independently.

9. The device according to claim 1, which also comprises rotary actuators.

10. The device according to claim 1, which is associated with:
   a plurality of local servers for recording data that are characteristic of measurements of local values of parameters that are directly or indirectly dependent on, and/or are related to an amount of energy received or generated by said device, and for transmitting such data;
   means for storing centralized and remote data, for storing the data transmitted by the local servers;
   a first communication network for transmitting the local measurement data to the local servers; and
   a second communication network for transmitting the data from the local servers to centralized storage means.

11. The device according to claim 2, wherein the solar panels are photovoltaic panels.

12. The device according to claim 2, which comprises at least one sensor adapted to measure values of parameters that depend on sunlight.

13. The device according to claim 12, wherein the sensor(s) is/are radiation, current, voltage or temperature sensors.

14. The device according to claim 12, which further comprises a board for acquiring values of parameters measured by the sensor(s).

15. The device according to claim 14, which further comprises a hoard for piloting a position of the actuators according to the values of the parameters acquired by the acquisition board, so that, during the day, the panels follow the path of the sun.

16. The device according to claim 3, which comprises at least one sensor adapted to measure values of parameters that depend on sunlight.

17. The device according to claim 16, wherein the sensor(s) is/are radiation, current, voltage or temperature sensors.

18. The device according to claim 16, which further comprises a board for acquiring values of parameters measured by the sensor(s).

19. The device according to claim 18, which further comprises a board for piloting a position of the actuators according to the values of the parameters acquired by the acquisition board, so that, during the day, the panels follow the path of the sun.

20. The device according to claim 11, which comprises at least one sensor adapted to measure values of parameters that depend on sunlight.

21. The device according to claim 1, wherein each of the respective actuators has an adjustable inclination with respect to said anchoring holder.

* * * * *